United States Patent [19]

Bellofatto

[11] 4,189,922
[45] Feb. 26, 1980

[54] CONVERTING SOLAR ENERGY INTO ELECTRIC POWER

[75] Inventor: Oreste Bellofatto, Milan, Italy

[73] Assignee: Snamprogetti S.p.A., San Donato Milanese, Italy

[21] Appl. No.: 884,400

[22] Filed: Mar. 8, 1978

[30] Foreign Application Priority Data

Mar. 22, 1977 [IT] Italy .................. 21483 A/77

[51] Int. Cl.² .................. F03G 7/06; F02C 1/04; F02C 1/06
[52] U.S. Cl. .................. 60/641; 60/659; 60/676; 60/682
[58] Field of Search .............. 60/641, 650, 682, 676, 60/659

[56] References Cited

U.S. PATENT DOCUMENTS

| 784,005 | 2/1905 | Ketchum | 60/641 |
| 3,152,442 | 10/1964 | Rowekamp | 60/641 |
| 3,203,167 | 8/1965 | Green | 60/641 |
| 3,654,759 | 4/1972 | Abbot | 60/641 |
| 3,699,681 | 10/1972 | Frutschi | 60/682 |
| 4,091,622 | 5/1978 | Marchesi | 60/641 |

FOREIGN PATENT DOCUMENTS

| 1004594 | 2/1977 | Canada | 60/676 |
| 1122344 | 9/1956 | France | 60/641 |

Primary Examiner—Allen M. Ostrager
Attorney, Agent, or Firm—Morgan, Finnegan, Pine, Foley & Lee

[57] ABSTRACT

A method for converting solar energy into electric power is disclosed, in which air, preheated and precompressed is additionally heated in a solar heater and sent to work in a turbine unit connected to an electric power generator.

4 Claims, 1 Drawing Figure

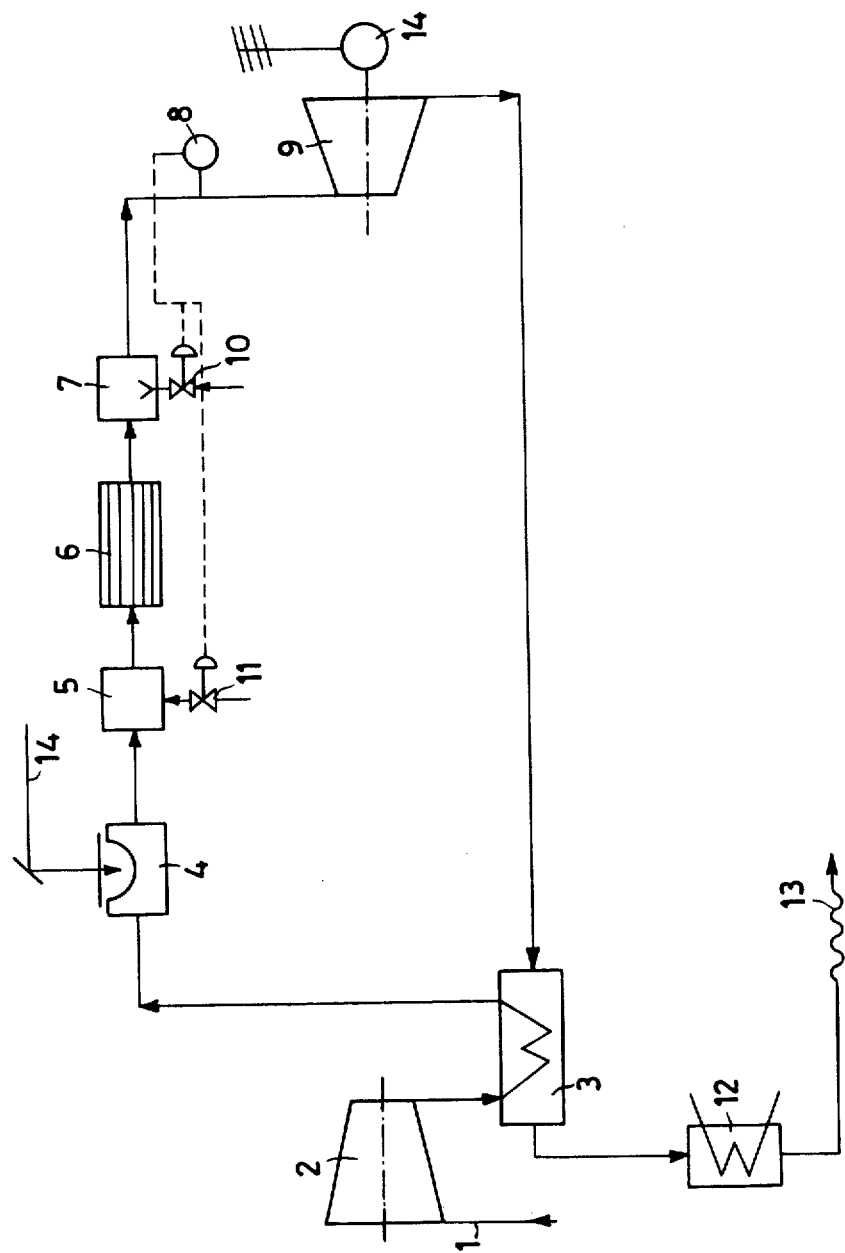

CONVERTING SOLAR ENERGY INTO ELECTRIC POWER

This invention relates to a method for the production of electric power by exploiting solar energy.

More particularly, the present invention relates to a method for the production of electric power by exploiting solar energy in an open loop layout, with an expansion turbo-unit.

Solar energy has already been used for household and industrial applications, but, almost exclusively, for heating liquids or for melting metals. It was thought that to use the solar energy for heating gases, more particularly air, for producing electric power was not remunerative and thus that it had no industrial importance.

It has now been found that it is possible to exploit the solar energy for heating gases, more particularly air, for the production of electric power by using air, after having compressed it in an open-loop plant, said air having previously been heated to a high temperature in an expansion turbo-unit connected to an electric power generator. The method for the production of electric power according to the present invention comprises the steps of compressing the ambient air up to a pressure of 6 to 60 bars and over, preheating the ambient air to a high temperature at the expenses of the air emerging from the turbo-unit, additionally heating the air in a high-temperature solar heater (500° C.-900° C. and over) and causing the air to flow, after having previously been preheated with a startup burner put into action at the start of the operation, through a heat accumulator and then through an auxiliary combustion system to be put in service when the solar energy is not abundantly available, expanding the air in the turbo-unit to which the electric power generator is connected, recycling the air after the expansion in the turbo-unit to the preheater for the ambient air and finally possibly using the air which is still hot for central heating and/or the production of steam and/or hot water.

The method according to the present invention will better be understood from the accompanying drawing which shows only an exemplary, non-limiting embodiment of the invention.

Ambient air, 1, enters the compressor 2, wherein it is compressed to a pressure of 6 to 30 bars and over, whereafter the air is passed to the heat-exchanger 3, in which the temperature of the air is raised at the expenses of the heat of the air discharged from the turbine 9. The preheated air is then passed to the solar heater 4 (14 indicates the sun rays), wherein its temperature is raised to a value of from 500° C. to 900° C. and over according to the kind of turbo-alternator which is employed and to the performance of the solar heater.

The numerals 5 and 7 indicate the starting burner and the ancilliary integration burner to be actuated when the solar energy is not enough or is lacking, respectively.

At 6, a heat accumulator has been shown, by the agency of which it is possible to diminish the temperature drop of the air, by heating said air in the periods of time in which the solar energy is inadequate, prior to actuating, either partially or at full rate, the auxiliary burner 7.

At 10 and 11 there have been indicated the regulation valves for the fuel feed to the starting burner and the auxiliary burner. Such valves are opened as a function of the temperature regulator 8.

The air, after having been heated to the desired temperature in the solar heater, is caused to flow through the devices 5, 6 and 7 aforementioned and is allowed to be expanded in the turbine 9: the latter is matched to a generator 14. The air emerging from 9 is thereafter sent to 3, as outlined above, and possibly to a steam generator and/or water preheater 12, when so to do is appropriate, and is finally exhausted through 13.

The method according to the present invention is an advantageous replacement for the steam cycles or gas closed loops which are equally based on solar energy. It has, in fact, the advantage of a lesser initial cost and does not require the use of a coolant medium when the production of electric power is requested exclusively.

The method according to the present invention, moreover, is quick-starting and can be brought to a steady run rapidly. It affords considerable opportunities to integrate the conventional fuels for gas turbines.

The exhausted hot air can possibly be used for heating fluids in gas closed loops and/or for the production of steam and/or hot water as indicated above.

I claim:

1. A method for the production of electric power by exploiting solar energy and using an expansion turbine unit, comprising the steps of compressing ambient air up to a pressure of at least from 6 to 30 bars, preheating the ambient air with the heat of the air emerging from the expansion turbine unit, further heating the preheated and compressed air in a solar heater to a temperature of at least from 500° C. to 900° C., causing the heated and compressed air to flow first through a combustion system actuated at the start of the method, then through a heat accumulator and through an auxiliary burner actuated when the solar energy is inadequate, allowing the heated and compressed air to be expanded in the turbine unit to which the electric power generator is connected, and recycling the air after the expansion in the turbine unit for at least preheating the ambient air.

2. The method for the production of electric power according to claim 1, wherein the recycled hot air also is used to heat a fluid in a closed loop.

3. The method for the production of electric power according to claim 1, wherein the recycled hot air also is used to heat water.

4. The method for the production of electric power according to claim 1, wherein the recycled hot air also is used to produce steam.

* * * * *